(12) United States Patent
Fridman et al.

(10) Patent No.: US 8,126,426 B2
(45) Date of Patent: Feb. 28, 2012

(54) SYSTEM AND METHOD FOR ASSESSING MOBILE APPLICATION VALUE

(75) Inventors: Sharon Fridman, London (GB); Irad Dor, London (GB)

(73) Assignee: Neustar, Inc., Sterling, VA (US)

( * ) Notice: Subject to any disclaimer, the term of this patent is extended or adjusted under 35 U.S.C. 154(b) by 388 days.

(21) Appl. No.: 12/509,622

(22) Filed: Jul. 27, 2009

(65) Prior Publication Data

US 2011/0022444 A1 Jan. 27, 2011

(51) Int. Cl.
*H04M 11/00* (2006.01)
(52) U.S. Cl. .................. 455/405; 455/406; 455/466
(58) Field of Classification Search .................. 455/405, 455/406, 466
See application file for complete search history.

(56) References Cited

U.S. PATENT DOCUMENTS

2009/0271247 A1* 10/2009 Karelin et al. .................. 705/10
2010/0106782 A1* 4/2010 Huang et al. .................. 709/206

* cited by examiner

*Primary Examiner* — Barry Taylor
(74) *Attorney, Agent, or Firm* — Katten Muchin Rosenman LLP

(57) ABSTRACT

A method and system for assessing a value of a first application with respect to a use of a mobile communication device in communication with a second communication device are presented. The method entails assigning a set of proximity values that relate the use of the application to the communication between the mobile communication device and the second communication device, and determining an impact and a value based on the proximity values. The proximity values may include a relationship proximity value, a time proximity value, a geographical proximity value, an action proximity value, and one or more user-defined proximity values. The determined value may be expressed as a monetary value.

20 Claims, 8 Drawing Sheets

SYSTEM AND METHOD FOR ASSESSING MOBILE APPLICATION VALUE

BACKGROUND OF THE INVENTION

1. Field of the Invention

The present invention relates to the field of computer-based and Internet/Web-based applications, as used on networks, either fixed or mobile, and mobile devices, such as cellular telephones and personal digital assistants. More particularly, the present invention relates to a comparative value and/or a monetary value associated with computer-based and Internet/Web-based applications.

2. Related Art

Telecommunication system operator environments and networks are becoming more and more open for third party products, applications, application development, and integration by various partners and end users. Products such as Service Delivery Platforms provide means for fast and agile application development and deployment and allow quick service and product introduction.

The integration and connectivity between Internet-based applications, social networks, and operator systems is constantly growing. However, the value of such new applications and integrations for the telecom operator, in terms of aspects such as image, stickiness, position, revenues, and income, are difficult to monitor or evaluate.

Accordingly, there is a need for a system that allows an operator to measure and evaluate the impact of such newly introduced applications for fixed networks and the impact of mobile systems and applications, whether service delivery platform ("SDP") originated or stand-alone, with respect to metrics such as income, revenues, and operator-defined added value. There is also a commensurate need for a system that allows an operator to measure and evaluate the impact of existing fixed and mobile systems and applications in a similar manner.

SUMMARY OF THE INVENTION

In one aspect, the invention provides a system for assessing a value of a first application with respect to a use of a first mobile communication device. The system comprises a computer server in communication with the first mobile communication device via a network and at least a second communication device in communication with the first communication device via the network. The server is configured to: detect a use of the first mobile communication device with respect to the second communication device, wherein the detected use includes a use of the first application and a communication with the second communication device; assign at least a first proximity value to the detected use of the first mobile communication device with respect to the detected use of the first application; use the assigned at least first proximity value to determine an impact of the detected use of the first application upon the detected use of the first mobile communication device; and use the determined impact to assess a value of the detected use of the first application with respect to the detected use of the first mobile communication device.

The use of the first mobile communication device may be a revenue-generating use. The server may be further configured to determine an amount of revenue derived from the detected use of the first mobile communication device, and to use the determined impact and the determined amount of revenue to assess the value of the detected use of the first application with respect to the detected use of the first mobile communication device. The at least first assigned proximity value may be selected from the group consisting of a relationship proximity value, a time proximity value, a geographical proximity value, an application proximity value, an action proximity value, and one or more user-defined proximity values.

The at least first assigned proximity value may include at least a relationship proximity value and a time proximity value. The relationship proximity value may be based on a first predetermined set of criteria. The assigned time value may be based on a number of nanoseconds, microseconds, milliseconds, seconds, or minutes that elapse between the detected use of the first application and a detected response by the second communication device. The server may be further configured to use the assigned relationship and time proximity values to determine an impact by computing a composite proximity distance. The composite proximity distance value may be selected from the group consisting of a Euclidean distance, a mean distance, a Mahalanobis distance, a Manhattan distance, a Chebyshev distance, and a Minkowski distance. The composite proximity distance may be computed by taking a square root of a sum of squares of the respective relationship and time proximity values.

The server may be further configured to assign a geographical proximity value to the detected use of the first mobile communication device with respect to the detected use of the first application, and to use the assigned relationship, time, and geographical proximity values to determine an impact of the detected use of the first application upon the detected use of the first mobile communication device. The assigned geographical proximity value may be based on a geographical distance between a location associated with the detected use of the first application and a location associated with the second communication device. The server may be further configured to use the assigned relationship, time, and geographical proximity values to determine an impact by taking a square root of a sum of squares of the respective relationship, time, and geographical proximity values. The server may be further configured to assign a user-defined proximity value to the detected use of the mobile communication device with respect to the detected use of the first application, and to use the assigned relationship, time, and user-defined proximity values to determine an impact of the detected use of the first application upon the detected use of the mobile communication device. The assigned user-defined proximity value may be based on a second predetermined set of criteria. The server may be further configured to use the assigned relationship, time, and user-defined proximity values to determine an impact by taking a square root of a sum of squares of the respective relationship, time, and user-defined proximity values.

The first application may be selected from the group consisting of: an instant messaging application; a text messaging application; a social networking application; an electronic mail application; a multimedia messaging application; a search application; a location application; an advertising application; a file sharing application; a portal/intranet application; a CRM application; an ERP application; an address book application; a database application; a process application; a procurement application; a blog application; an internal network collaboration application; a video download application; an audio download application; a video teleconference application; an audio teleconference application; a video streaming application; an audio streaming application; a picture album application; an Internet web site application; a web browsing application; a peer-to-peer file sharing or media streaming application; a voice-over Internet protocol application; a payment application; a financial or investment application; an insurance application; and a marketing application. The use of a mobile communication device may be selected from the group consisting of conducting a voice telephone call, sending a text message, sending an electronic mail message, using a web browser, uploading data, downloading data, sending information over a mobile data channel, and receiving information over a mobile data channel.

In another aspect, the invention provides a method for assessing a value of a first application with respect to a use of a first mobile communication device. The first mobile communication device is in communication with a second communication device via a network. The method comprises the steps of: detecting a use of the first mobile communication device with respect to the second communication device, wherein the detected use includes a use of the first application and a communication with the second communication device; assigning at least a first proximity value to the detected use of the first mobile communication device with respect to the use of the first application; using the assigned at least first proximity value to determine an impact of the detected use of the first application upon the detected use of the first mobile communication device; and using the determined impact to assess a value of the detected use of the first application with respect to the detected use of the first mobile communication device.

The use of the first mobile communication device may be a revenue-generating use, and the step of using the determined impact to assess a value may further comprise determining an amount of revenue derived from the detected use of the first mobile communication device, and using the determined impact and the determined amount of revenue to assess the value of the detected use of the first application with respect to the detected use of the first mobile communication device. The at least first assigned proximity value may be selected from the group consisting of a relationship proximity value, a time proximity value, a geographical proximity value, an application proximity value, an action proximity value, and a user-defined proximity value.

The at least first assigned proximity value may include at least a relationship proximity value and a time proximity value. The assigned relationship proximity value may be based on a first predetermined set of criteria. The assigned time value may be based on a number of nanoseconds, microseconds, milliseconds, seconds, or minutes that elapse between the detected use of the first application and a detection of a response by the second communication device. The step of using the assigned relationship and time proximity values to determine an impact may further comprise computing a composite proximity distance. The composite proximity distance may be selected from the group consisting of a Euclidean distance, a mean distance, a Mahalanobis distance, a Manhattan distance, a Chebyshev distance, and a Minkowski distance. The composite proximity distance may be computed by taking a square root of a sum of squares of the respective relationship and time proximity values.

The method may further comprise the step of assigning a geographical proximity value to the detected use of the mobile communication device with respect to the detected use of the first application. The step of using the assigned relationship and time proximity values to determine an impact of the detected use of the first application upon the detected use of the mobile communication device may further comprise using the assigned relationship, time, and geographical proximity values to determine an impact of the detected use of the first application upon the detected use of the mobile communication device. The assigned geographical proximity value may be based on a geographical distance between a location associated with the detected use of the first application and a location associated with the second communication device. The step of using the assigned relationship, time, and geographical proximity values to determine an impact may further comprise taking a square root of a sum of squares of the respective relationship, time, and geographical proximity values. The method may further comprise the step of assigning a user-defined proximity value to the detected use of the mobile communication device with respect to the detected use of the first application. The step of using the assigned relationship and time proximity values to determine an impact of the detected use of the first application upon the detected use of the mobile communication device may further comprise using the assigned relationship, time, and user-defined proximity values to determine an impact of the detected use of the first application upon the detected use of the mobile communication device. The assigned user-defined proximity value may be based on a second predetermined set of criteria. The step of using the assigned relationship, time, and user-defined proximity values to determine an impact may further comprise taking a square root of a sum of squares of the respective relationship, time, and user-defined proximity values.

The first application may be selected from the group consisting of: an instant messaging application; a text messaging application; a social networking application; an electronic mail application; a multimedia messaging application; a search application; a location application; an advertising application; a file sharing application; a portal/intranet application; a CRM application; an ERP application; an address book application; a database application; a process application; a procurement application; a blog application; an internal network collaboration application; a video download application; an audio download application; a video teleconference application; an audio teleconference application; a video streaming application; an audio streaming application; a picture album application; an Internet web site application; a web browsing application; a peer-to-peer file sharing or media streaming application; a voice-over Internet protocol application; a payment application; a financial or investment application; an insurance application; and a marketing application. The use of a mobile communication device may be selected from the group consisting of conducting a voice telephone call, sending a text message, sending an electronic mail message, using a web browser, uploading data, downloading data, sending information over a mobile data channel, and receiving information over a mobile data channel.

DETAILED DESCRIPTION OF THE INVENTION

Figure 1:
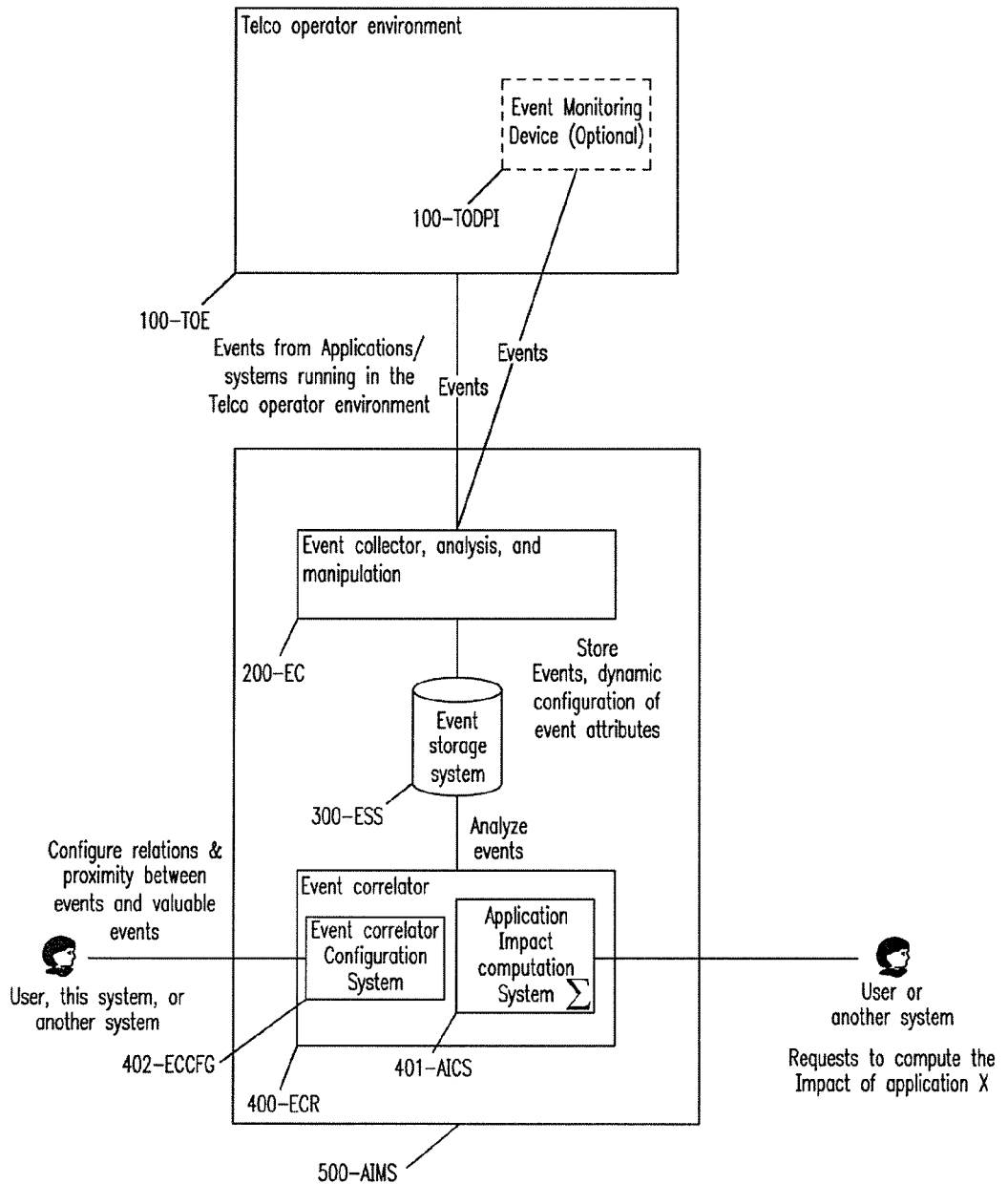
FIG. 1 illustrates a block diagram of a system for assessing a value of an application on a mobile or fixed network according to a preferred embodiment of the invention.

The following is a set of definitions of relevant terms:

Operator Environment—computer network composed of the various computer systems, network equipment and software applications that compose the core operational elements of an operator or telecommunications service ("telecom") provider business.

Operator Application—a software or combined hardware/software application that runs inside, or connects to, a corresponding Operator Environment.

Application Event—an event generated by a telecom-provider application, computer program, end user, end user device or any other entity that is connected to the telecom operator systems. The event can be any registered occurrence, status change, user action or interaction or application action or interaction or message.

Valuable Event—an application event that is valuable to the telecom operator. For example, a billable event is a valuable event, because it is an event that can be billed to the end user and generate revenues for the telecom operator. Valuable events are not limited to billable events; a valuable event can be any event the telecom operator decides has value for the telecom operator. It is expected that most operators will define their Billable events as Valuable Events.

Event Proximity—a proximity measure that measures a relation between two events using defined criteria such as: time, user group, application, application domain, action, and any other user-defined relation or measure.

Event Collector—a computer system, server, or a collection of systems and servers that is connected to a telecom operator system. The objective of an event collector is to collect all possible events generated by these systems. The connection can be via APIs provided by the various systems, inline ("bump-in-the-wire"), direct connection via standard network management interfaces (such as SNMP), and/or using proprietary interfaces.

Event monitoring device—a device or software module that can tap or be installed inside a computer or computer network and analyze application events, passing network packets information or otherwise other applicative events, and extracting meaningful event information. An example of such a device is a Deep Packet Inspection (DPI) device that sits inside a computer network and extracts applicative events from network traffic. A DPI device can detect and provide information on events such as voice calls, sending Short Message Service (SMS, also known as "text" messaging), IM or other messages, billing, provisioning, and so on. Another example of an event monitoring device is a software module that runs inside a computer and analyzes the applications that run inside to extract meaningful events out of them. Such modules can potentially monitor and analyze every type of event that is generated by a computer application.

Mobile network—refers to any current mobile network technology, such as GSM or CDMA, as well as evolving and new mobile technologies, such as HSPDA, W-CDMA, LTE, WiMax, and others. Mobile carriers include any carrier that operates on any such mobile network. Notably, some mobile carriers may allow fixed (i.e., non-mobile) personal computer web browsers to access their networks, and trigger the recipient to perform a valuable event in accordance with a preferred embodiment of the invention. For example, the recipient may be prompted to call the fixed sender using a mobile telephone.

Mobile device—refers to any one of a mobile or cellular telephone, a personal digital assistant (FDA), a laptop computer having Internet access, messaging devices, picture-taking devices, book reading devices such as the Amazon Kindle, global positioning system (GPS) devices, or other specialty-type devices. It is noted that, with the exception of the mobile or cellular telephone, these devices may or may not have telephone capabilities.

The system output is an indication of an application's impact on valuable events from various specific points of views of the beneficiary. This output can be consumed by multiple recipients and be used for multiple purposes. The following is a non-exclusive and non-limiting list of example consumers of the system output of the present invention: Mobile telecom providers; fixed-line telecom providers; other Tri/Quad-Play network providers; Internet service providers; application developers; application retailers/stores; commercial entities/brands (e.g., Sony, Adidas, etc.); advertising agencies and aggregators; third-party value creation vendors and solutions; marketing, business intelligence and analysis entities; governmental agencies; and research and education institutions.

The following is a non-exclusive and non-limiting list of example potential uses of the system output of the present invention: Evaluate mobile applications for launching; establish application pricing to end-users; negotiate commercial agreement with the application provider (e.g., revenue share split); determine and design application front-end user interface, priorities and visibility; design application marketing campaign based on application value; determine advertising and content embedded in the application based on its value, and pricing of same; and study application usage trends and patterns.

In a first exemplary usage scenario, a telecom operator measures the impact of an instant messaging ("IM") application on the revenue from SMS being triggered by IM. The operator discovers that IM application installed in his network triggers a substantial amount of additional SMS events. This measurement helps the telecom operator maximize profits by giving free IM to its clients for the mere purpose of maximizing SMS traffic.

In a second exemplary usage scenario, a telecom operator measures the impact of an instant messaging ("IM") application on the revenue from voice telephone calls being triggered by IM. The operator discovers that IM application installed in his network triggers a substantial amount of additional voice telephone call events. This measurement helps the telecom operator maximize profits by giving free IM to its clients for the mere purpose of maximizing voice telephone traffic.

In a third exemplary usage scenario, a telecom operator measures the impact of an application developed by a third-party developer on the revenue from SMS or voice telephone calls being triggered by the application. For example, suppose that a 13-year-old girl develops a regular web page for exchanging Transformers™ icons between mobile users and with desktop users. The application can be virally distributed among users. The application causes a big stream of excited phone calls between young users who really like it (her friends and family). The telecom operator measures the impact of the web page application on the number of phone calls between this web pages users. The telecom operator (can be either a fixed line operator or a mobile operator) can share revenues with the application developer; e.g., give the application developer a fixed percentage of revenue arising from voice telephone calls.

In a fourth exemplary scenario, the telecom operator may internally use information that is not monetary in nature. For example: Suppose that a telecom operator opens a mobile-based fan group on Facebook. Many unrelated users from around the world join this group because it sounds cool. The telecom operator sends an email about the group to all of its users that have a particular cellular telephone model. The telecom operator uses the system to measure the impact of the Facebook fan group on the numbers of users that joined it as a result of this specific email. This provides valuable information to the telecom operator's marketing department to allow better marketing of the particular cell telephone model in the future. The telecom operator could also measure numbers of users for subset groups, e.g., the "joined young users" subgroup; the "joined users from [a particular geographical area]" subgroup; the "joined users with income >50K/year" subgroup, etc.

In a fifth exemplary scenario, the telecom operator may wish to sell the information to a third-party commercial entity. For example: Suppose that Adidas uses SMS to send a message with Adidas web-site link to the cell phones of a user group (say all 12-30 year old in specific area). The telecom operator configures the system to measure the impact of this SMS on the number of entries to the web site done from the mobile device browser (or desktop browser) for various user intersections, including the following: Granular age groups (12-16, 17-20, 21-25, 26-30); geographical locations (East London, South London, West London); mobile device types (PDAs, IPhone, Nokia 63xx, etc.); a combination of the above; and/or any other collectible event info that is collected and can interest Adidas. The telecom operator sells this information to Adidas to allow better and more accurate ad targeting and user profiling in the future. It is noted that in this particular case, the valuable event is not the SMS itself, but rather the web site entries.

Referring to FIG. 1, an application impact measurement system 500 according to a preferred embodiment of the present invention is shown. The telecom operator environment 100 contains a multitude of systems, servers, applications and entities. The event collector subsystem 200 connects to various systems in the telecom operator environment and pulls, scans, or otherwise receives and collects all possible generated events. The event collector 200 connects to the telecom operator systems using the various interfaces they provide, such as socket, ftp, log facilities, SNMP, web services, etc. For systems with no such interfaces, the collector 200 can intercept some or all of the events by tapping into the network and analyzing network packets, either directly or using an event monitoring device, such as a DPI device. An optional event monitoring device 101 may be used to monitor the telecom operator network. This type of monitoring can be achieved by standard means of duplicating and mirroring telecom provider network traffic to the event monitoring device 101. The device 101 can then report to the event collector 200 on various applicative events it detects and that are generated by the various systems inside the telecom operator environment 100. An event storage/repository subsystem 300 can be a standard database or any other system that can store large quantities of event information items.

The event correlation system 400 includes a configuration module 402 and a computation system 401. The event correlation system 400 is configured by the user regarding the application(s) for which the impact is to be computed. The event correlation computation system 401 is responsible for scanning the events stored in the event storage module 300 according to the configuration stored in the event correlation configuration system 402, and computing application impact for requested applications.

Figure 2:
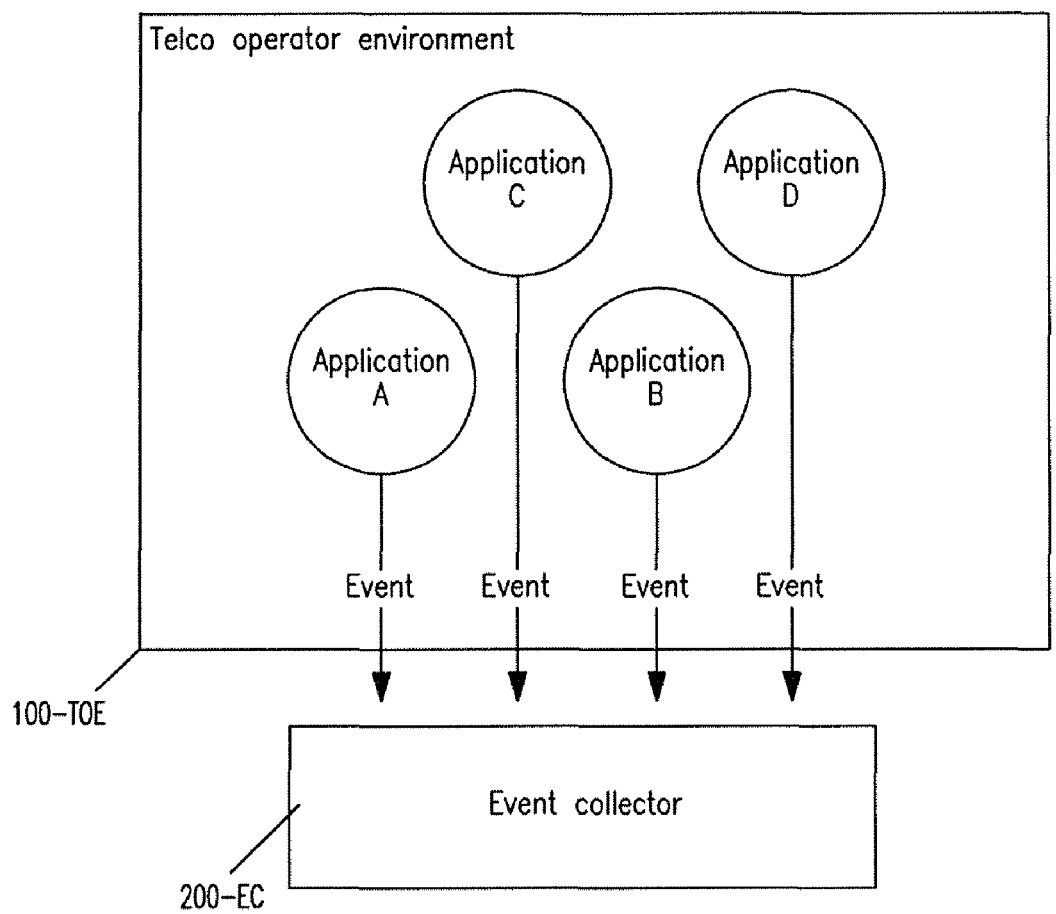
FIG. 2 illustrates a block diagram of an event collection from applications module as used in the system of FIG. 1, according to a preferred embodiment of the invention.

Referring to FIG. 2, a block diagram illustrates the collection of events generated by different applications that run in the telecom operator environment. These events can be collected using many possible well known methods and interfaces.

Figure 3:
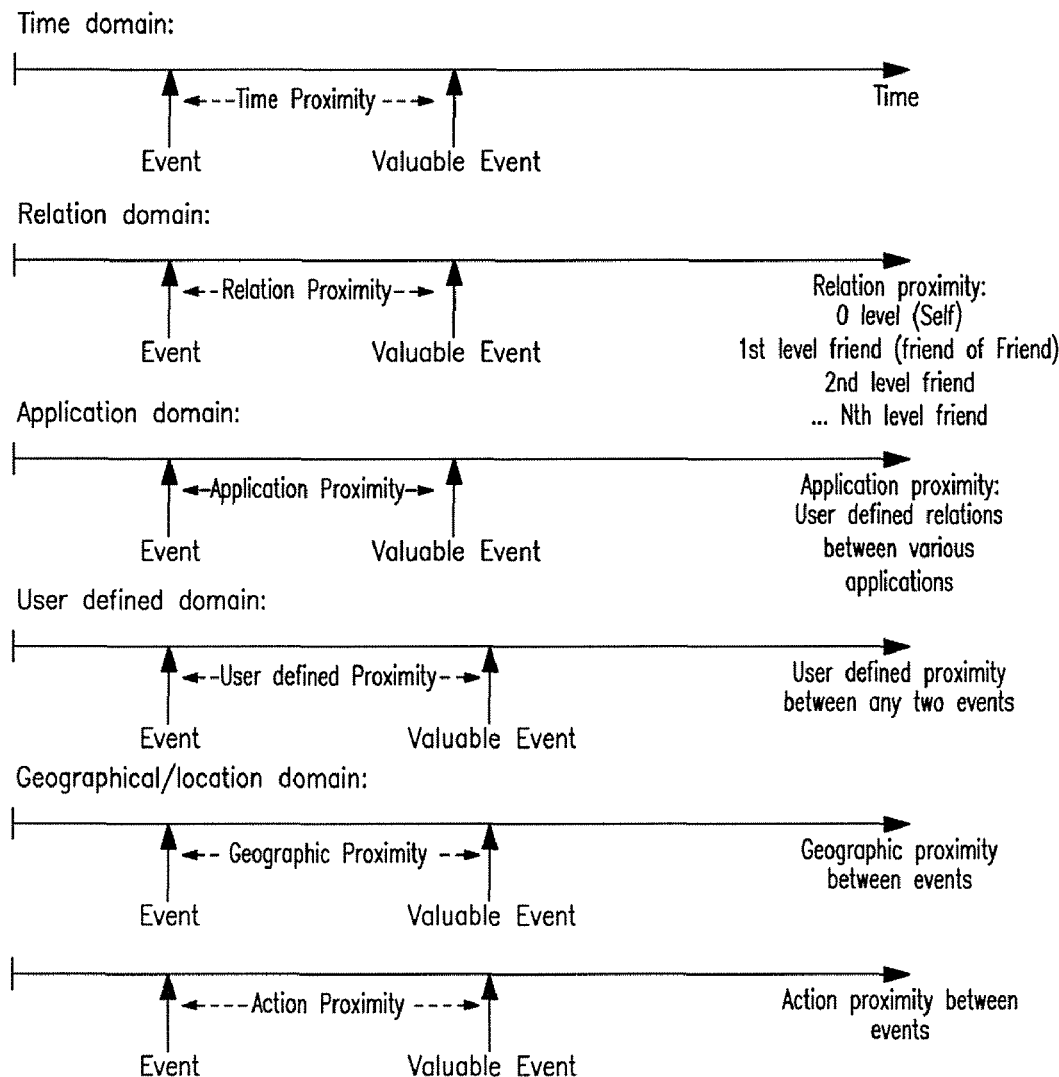
FIG. 3 illustrates an exemplary set of event proximity domains as used in the system of FIG. 1, according to a preferred embodiment of the invention.

Referring to FIG. 3 and Table 1 below, various exemplary event proximity domains are demonstrated and described:

TABLE 1

Event proximity domains

| Proximity Domain | Description | Examples |
| --- | --- | --- |
| Time proximity | Time proximity (timeproxim) is the time proximity between EVENT and VALUABLE_EVENT. It can be the time in seconds between the occurrence of the events or any other numerical time related indication. | Time in seconds, milliseconds, etc. between the occurrence of events |
| Relation proximity | This is basically social proximity. Small figure can indicate close friends, family, etc where bigger numbers can indicate friends-of-friends (2nd, 3rd, Nth degree friends, and so on). For example - it can be the social network friendship relationship between the users that are associated with EVENT and VALUABLE_EVENT. Family relationship being saved in the telecom provides CRM system, friends in an address book saved on the telco provider network, etc. | The value can be small for users that are 1st degree friends, bigger for users that are 2nd degree friends, and so on. For example, consider user X that generates an event which directly generated valuable events in an outer proximity of relations - X sends an IM to his friends which forward to their friends which make a voice call. So the initial IM and the voice call events have two hops of relation between them. As a result - the relational proximity is not as small as in between direct friends but still relevant for the voice call. Another example is an Indirect valuable event from family/college in same circle of |

TABLE 1-continued

Event proximity domains

| Proximity Domain | Description | Examples |
| --- | --- | --- |
| | | recipients. So a kid sends an IM to one parent, and this causes the OTHER parent does to initiate a phone call - a billable event back to the kid. The initial IM and the phone call have small relation proximity because they are events inside the family (as identified by telecom provider records or configuration). |
| Application proximity | Application Proximity is the application proximity between the applications that generated with EVENT and VALUABLE_EVENT. Application proximity can be a user defined numeric value. For example - two applications that serve the same function or exist under the same context can have application proximity of 1. Applications that are separate, but occasionally communicate with one another by passing information or messages have an application proximity of 2. While completely unrelated applications will have a big application proximity value and so on. Application proximity can be configured by the user because new applications or new uses to existing applications can make unrelated applications 'closer' or basically put two existing applications under the same context. | Example for application with small proximity can be voice call and SMS, two Facebook applications, SMS and IM and so on. Example: A user uploads a picture to Facebook, which is notified to the user's spouse, who then downloads the picture to her mobile device and then uploads it from the mobile device to a Picasa application and/or to a blog. There is a measurable application domain proximity between the Facebook, Picasa, and blog applications. |
| Action proximity | Action proximity refers to related actions that may be performed in the context of same or different applications, such as, for example, uploading and downloading a picture. | Example: A first user uses a first application to upload a picture of a bicycle. A second user, not related to or known by the first user, uses an unrelated second application, such as a portal search engine, to download the picture, because the second user likes the picture. Although the users and the applications are not closely related, the actions are related, thereby yielding an action proximity. |
| User defined event proximity | This is a set of user defined, configurable, proximity values between EVENT and VALUABLE_EVENT. User defined event proximity is a configurable numerical value that the user can define as a proximity indicator between any two events. | For example a user can decide that any events between family members have small proximity value while events between unrelated users have bigger proximity value. Another, slightly more complex example for a configured user defined event proximity is "any events from social networking applications with user age <25 and time proximity of less than 5" will have user-defined event_proximity[1] of 2, etc. Another example is a campaign - user defined proximity can also refer to a viral event such as email to multiple friends that is being forwarded between people, group or event invite and so on. So for example - the system may be configured or even dynamically set two events to have a small user-defined-proximity[x] because they relate to two users that belong to a specific ad campaign, email message forward, or group invite or message. |
| Geographic or Location proximity | This is the geographical proximity between two users that are associated with EVENT and VALUABLE_EVENT. It can be a user defined value that describes their proximity in meters or any other GPS or physical distance information. The proximity can also refer to other event attributes other than user, so that two IM message events that discuss the same location (a certain pub) can | For example -the geographical proximity of two events from users that reside in the same geographical area (mobile network cell, building block etc) is smaller than the geographical proximity of these events when the users are far from each other (on different parts of the globe). Another example is two Instant message or SMS events that discuss a specific single location (pub) or two locations (gym, gym-pool) that are geographically close to each other can have a |

TABLE 1-continued

Event proximity domains

| Proximity Domain | Description | Examples |
|---|---|---|
| | be close geographical proximity. | small proximity figure while similar events that talk about two completely different locations will have a bigger geographical proximity value. |

In a preferred embodiment of the invention, all proximity measures should be normalized according to some scale so that ultimate values are, for example, between 0 and 1. Additional proximity measures can be defined. Additionally, the user-defined allows for extensibility to any criteria, as required. Additionally, each proximity measure can potentially be an array or a set of numerical values. For example, time proximity between two SMS messages can be an array or set that includes multiple numerical values: 1) The time delta between the initiation of two messages; 2) the time delta between the receive times for the two events by interim systems; 3) the time delta between the actual users' receipts of the two events; etc.

Figure 4:
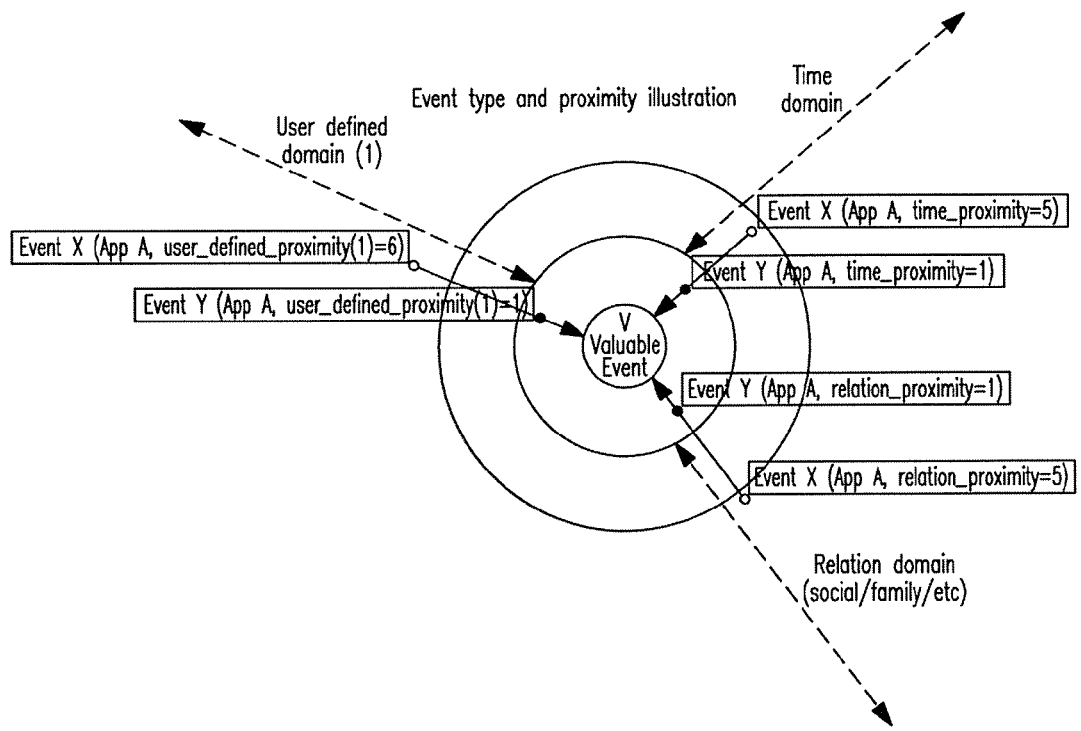
FIG. 4 illustrates an exemplary set of event types and corresponding proximities as used in the system of FIG. 1, according to a preferred embodiment of the invention.

Referring to FIG. 4, a diagram illustrates an exemplary set of event types and corresponding event proximities for specific applications A and B. The diagram illustrates how two events, events X and Y, generated by application A and B may be related to a specific valuable event V. For example, valuable event V could be an initiation or completion of a voice call, which is usually valuable to a telecom operator. The plane angle represents the domain and linear distance from the valuable event represents the proximity value. As one can see in this diagram, each event X and Y has different proximity values for the various domains (time, user_defined_1, friendship). Event Y is closer to the valuable event V than event X in all three domains, and therefore, event Y is deemed to be "closer" to event V than event X. If events X and Y were the only two events ever generated by applications A and B, then one could clearly say that application B is closer to event V than application A. As a result, the impact of application B on event V is determined to be larger than that of application A on event V (i.e., it is more likely that V is a result of B than that it is the result of A).

Figure 5:
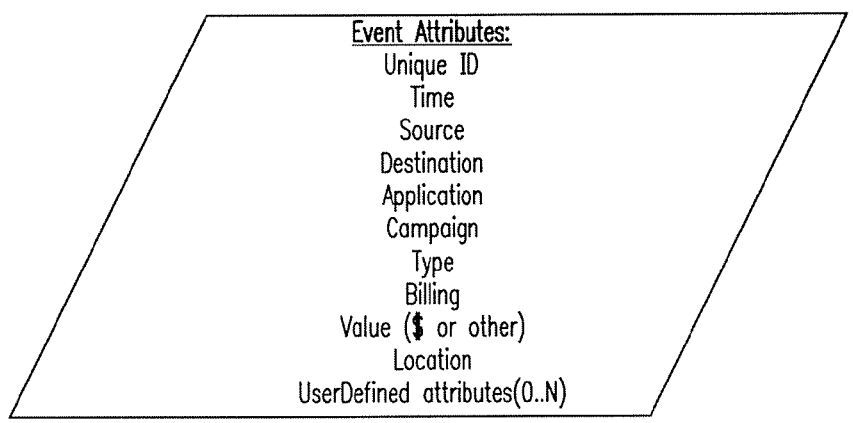
FIG. 5 illustrates an exemplary set of event attributes as used in the system of FIG. 1, according to a preferred embodiment of the invention.

Referring to FIG. 5, the attributes that the system keeps for each event that it saves are shown. The various fields and description are below:

Unique ID—a global unique identifier that distinguishes this event from all other events.

Time—a time field that saves the time on which this event was generated or captured.

Source—the end user, or system, that is associated with the initiation of this event.

Destination—the end user, or system, that is associated with the destination of this event. In particular, it is noted that in some instances, there are destinations to the actions performed by a user using an application via a mobile device to other recipients.

Application—the application that generated this event.

Campaign—The advertising or marketing or spontaneous viral campaign to which this event belongs. This field can be used to create relationships between event generated by campaigns and valuable events. This field could possibly be set by a user as part of the system configuration. This field can also be dynamically set by the system for various events that are determined by the system to be related to the same campaign, process flow, or any other logic.

Type—event type (SMS, MMS, email, instant message, presence or status change, any other transaction confirmation or failure, etc.).

Billing—notes to what capacity the event is billable. This field could potentially include several levels of billing.

Value—notes the value of this event. This field can be a number representing U.S. dollars or any other monetary value or other representation of value.

Location—the geographical location associated with the event. It can be end-user location, a Global Positioning System (GPS) information passed in a message, etc. The location can also be a location that is extracted from the content of the event or message itself.

UserDefined attributes (0 . . . N)—user defined key-value pairs that can be configured to accompany the saved occurrence of a specific event (by application and type for example). These attributes may or may not accompany the event when it is captured/recorded and could potentially be added at a later time by the end user that configures the system.

Figure 6:
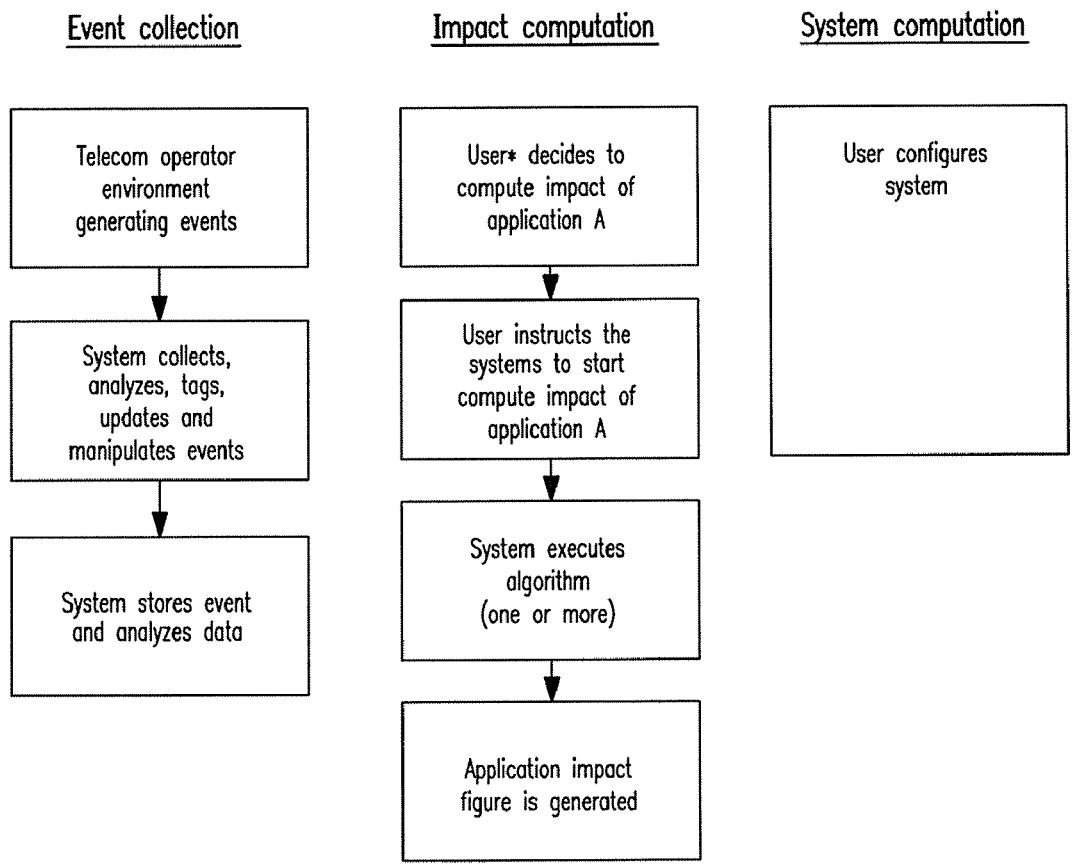
FIG. 6 illustrates a high-level set of flowcharts that implement a method of assessing a value of a mobile application according to a preferred embodiment of the invention.

Referring to FIG. 6, three flowcharts illustrate a general process for a method of assessing the value of mobile applications according to a preferred embodiment of the invention. In the event collection process, the event collector collects applicative events from the various applications in the telecom provider network. This collection can be continuous or on-demand. This can be achieved in many possible ways known in the industry. Some, but not all, include the following:

Direct connection/interface to various applications in the telecom provider network by means of inter-process communication, remote procedure calls, sockets, various distributed computing interfaces (Corba, DOOM, SOAP, HTTP, RPC, etc).

Indirect connection/interface to various applications in the telecom provider network by means of analyzing offline transaction logs or other application generated files that contain applicative events.

Receiving events or information from a third-party entity or service providers and using it in the event collection process. For example, a telecom operator may receive a list of public emails of celebrities from a gossip news agency and these help defining events with these emails as "valuable" during the event collection process.

Directly analyzing applications that run in the computing environment by means of software modules that track applications on each computer.

Connection to a event monitoring or DPI device that is analyzing network traffic on the telecom provider network environment. The events are collected from the DPI device either directly or via mediation system (e.g., database based, or other).

It is noted that the event collection phase may include a dynamic configuration based on learning or feedback from previous iterations or user templates.

In the impact computation process, a computation application impact is performed upon user request and after the various parameters have been configured into the configuration system 402. The computation algorithm is as follows:

1. User decides to compute the impact of application A on all valuable events (or a subset of them as configured into configuration system 402).
2. User configures system 402 with the relevant application (A), the list of valuable events the user wants to measure (for example—only measure the impact of A on voice calls, SMSs, etc.), and other desired parameters.
3. User configures system 402 with various proximity relationships between events.
4. User selects a specific application impact algorithm out of a set of algorithms that is programmed into event correlation computation system 401.
5. User initiates a computation request to the system 401.
6. The system runs a correlation algorithm that scans the event storage system and computes the impact of application A on the configured valuable events.
7. The system returns a value that represents the impact of application A on the configured valuable events. In the examples below we demonstrate two possible outputs:
   The value can be a relative number that is used for comparison purposes with other similar results to determine which applications have a greater impact and which have a lesser impact.
   The value can be the summary of the real value of all valuable events caused by application A (so the value will be in $ or any other currency).

In the configuration process, a user or another system or the system itself is able to configure the system to provide the required output. Dynamic configuration includes the following actions:

Configuration can be triggered and done while events are being collected in the event collection phase, according to the ongoing events analysis and system deductions from the event collection.

Specific meta-data and event attributes can be added and set while events are being collected. For example, event "user defined" attributes can be set to various values that represent system insights about the events as they are being collected.

Various configuration states can co-exist and be turned "on" and "off" while the system collects the events. So, for example, if the system identifies a specific event flow that lasts for three hours, say SMS messages flowing between soccer fans during a soccer game, the system can tag the relevant events with this information as "SMS message by soccer game fan" for the time of the game, and then stop doing that once the game is over.

Static configuration happens before or after the event collection phase. The static or dynamic configuration includes the following items:

1. The application for which the impact shall be measured. For example, "Social network connectivity service/application", "email application", or "IM application".
2. Cause and effect—the system can be configured, for any possible event couples/streams/sets, to determine whether an application event is the cause of the revenue-generating event, or not (e.g., the billable event was bound to happen, and the application event was a mere coordination method/step), in which case no revenue will be credited to the application event, and it will be dropped from the computation.
3. Known event flows The system can be configured to identify, for various event couples, sets, or flows, a "reverse process", in which a billable event is known, and a triggering event that will occur prior to the billable event is generated to create and/or manage the billable event. The system can be configured to credit the valuable/billable event to the triggering event or not to credit it. In this context, "crediting" means that the triggering event will take part in the computation, and proximity values between these events may be modified by the system.
4. Event attributes—any event attribute can be set and possibly updated or configured while the system is collecting the events.

Specifically user-defined event attributes for specific events or groups of events. This could also be according to online analysis of events as the system collects them.

As an example, two or more email message events with the same subject (e.g., "party invitation") could trigger a state in which user-defined-attributes for events from these users for a specific time span (e.g., a day before the party) are set to reflect the fact that the users are under the same "campaign". Therefore, these users will be marked as "under party campaign" for a fixed amount of time, and all events from/to these users could have one of its user-defined-proximity fields set to "party campaign", etc.

5. Proximity values (user-defined and other) between events according to criteria based on the event attributes. A determination of which algorithm to use for event value computation may also be performed. For example:

A person sends an IM to one call center representative, and another representative calls back. These two representatives belong to the same corporation and all events are under the same cooperation flow. Assuming the system is configured to identify these facts, the system can reflect these facts in the attributes for the events collected so that the telephone call event is configured to have closer relation-proximity (or other proximity) with the original IM even though the telephone call arrives from a non-related user.

There is a certain known flow that causes a valuable event to happen. Notably, the events do not necessarily have time proximity. For example, an event could be an eBay auction that can take months. If the system is configured to know this fact, the system can choose to dynamically configure the events of this flow, as the events are collected, to have specific attributes and proximity measures for this specific flow.

6. Value figure for various telecom operator events defined as "valuable" (e.g., telephone call, SMS, etc.). Value can be monetary or other. An event can have any number of value attributes; therefore, the event may have different values with respect to different interested parties.
7. Output type—The output type could be either an "application-value", which is a numerical value that has no direct monetary value but rather represents how a specific application performs compared to other application, or the output type could be a number that represents real world value.

8. Algorithm method—the system can be statically or dynamically be configured to choose a specific value computation algorithm for any specified set of events.

Figure 7:
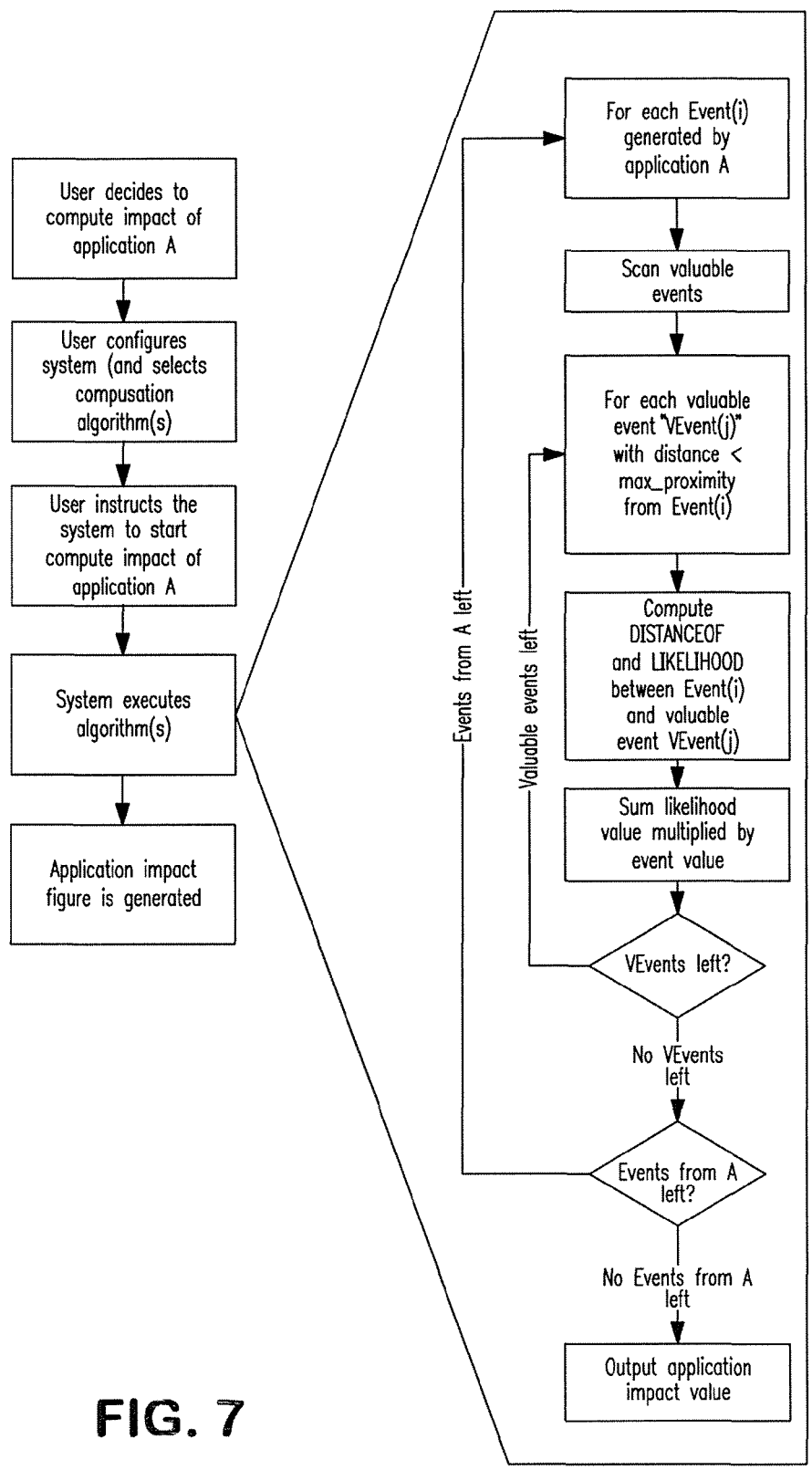
FIG. 7 illustrates a detailed flowchart for a method of assessing a value of a mobile application according to a preferred embodiment of the invention.

Referring to FIG. 7, a possible application impact computation algorithm is described below using the following diagrams and equations. Note that the system 401 should be able to use any other machine computable algorithm, as programmed into it. In this specific algorithm example, the proximity value is required to be an integer number greater than or equal to one. A value of one denotes "close" proximity between events; the larger the number, the more remote the events are with respect to one another.

1. User initiates a computation request to the system.
2. For every Event(n) associated with application A, the algorithm scans all the valuable events in a pre-configured proximity radius.

It is noted that the number of valuable events included in the computation is limited by not including events that are too distant, or not relevant according to some other criteria, as these are not relevant for the impact and may overload the computation. The relevant maximum proximity value should be configured in system 402.

The algorithm computes the likelihood between Event(n) and VEvent(m) and then multiplies it by the value of VEvent(m). Once it does that for all valuable events that are close enough to Event(n), it moves to Event(n+1) and so on.

3. The algorithm makes sure not to scan/count the same valuable event twice (so that application that is event 'heavy' but cause only little valuable events is not biased favorably). This can be done by marking valuable events that were "used" already and not going though them again, or by taking only the single nearest likelihood value between some application A event and each valuable event.
4. For the sake of this algorithm, it is assumed that Event and VEvent from the same user can be taken into account only if specifically configured into the system by the user, otherwise they will be discarded.

5. The algorithm sums all these multiplications to produce a compound "application-value" number. Note that in this specific implementation, this number is relative and will not have monetary value.
6. Alternative impact computation: In order to obtain application monetary added value, if required by the configuration, a slightly simpler algorithm could summarize the configured monetary value of all occurrences of valuable events that were a result of events from A within a compound, or even specific, proximity value. This number will give the amount of money that was generated as a result of events coming from application A triggering billable events (see "alternative impact calculation" in the equation below).

In a preferred embodiment of the invention, the compound proximity (distance) between event and valuable event is the root of the sum square distances between these events (Euclidean distance), as provided by Equation 1:

Distance Between Events $$DISTANCEOF(EVENT, VALUEABLE\_EVENT) = \sqrt{\begin{array}{c} e_1 \cdot timeproxim^2 + e_2 \cdot relationproxim^2 + \\ e_3 \cdot appproxim^2 + e_4 \cdot geoproxim^2 + \\ e_5 \cdot actionproxim_1^2 + e_6 \cdot userdefinedproxim_1^2 + \ldots \end{array}}$$

Equation 1

$(e_{[n]} = 0/1)$

A generic representation of compound distance equation between event and valuable event, taking all proximity methods into account and where variables e(n) are used to toggle (i.e., disable enable) specific proximity measures (allowing multiple formulas according to system configuration).

In a preferred embodiment of the invention, Equation 2 yields the likelihood of VALUABLE_EVENT happening as a result of EVENT is the reciprocal of the distance between these two events (note: this is not a probabilistic likelihood).

Likelihood between Events $$LIKELIHOOD(VALUEABLE\_EVENT, EVENT) = \frac{1}{DISTANCEOF(EVENT, VALUEABLE\_EVENT)}$$

Equation 2

In a preferred embodiment of the invention, an impact value may be computed using Equation 3 by summing the value of valuable events multiplied by the likelihoods of each valuable event happening in as a result of events from application A, showing the impact of all events from application A on valuable events (VEvent is valuable event), as a numeric value.

Impact Computation $$impact(APP(A), VALUEABLE\_EVENTS) = \sum_{\substack{n:AppA \\ Events}} \sum_{\substack{m:Valuable \\ Events \\ distance<max\_distance}} LIKELIHOOD$$
$$(EVENT(n), VEVENT(m)) \cdot EVENTVALUE(m)$$

Equation 3

Equation 4 provides a variant formula computes a monetary rather than relative value (e.g. based on currency as taken from the value attribute of the relevant valuable events).

Alternative Impact Computation $$impact^*(APP(A), VALUEABLE\_EVENTS) = \sum_{\substack{n:AppA \\ Events}} \sum_{\substack{m:Valuable \\ Events \\ distance<max\_distance}} EVENTVALUE(m)$$

Equation 4

The following formulae are derived from the general formulas in the previous section, and are used for the test cases that follow. Equation 5 provides a possible event distance computation between event and valuable event taking only relation proximity into account. Accordingly, in this example, event proximity between two events is computed only from family or friendship relation and not from the time delta between the two events:

Relation Only Proximity    Equation 5

$$DISTANCEOF(EVENT, VALUEABLE\_EVENT) = \sqrt{relationproxim^2}$$

Equation 6 provides a possible event distance computation between event and valuable event taking time proximity and relation proximity into account:

Time and Relation Proximity    Equation 6

$$DISTANCEOF(EVENT, VALUEABLE\_EVENT) = \sqrt{timeproxim^2 + relationproxim^2}$$

Equation 7 provides a possible event distance computation between event and valuable event taking event time, and user defined proximity into account:

Time and User Defined Proximity    Equation 7

$$DISTANCEOF(EVENT, VALUEABLE\_EVENT) = \sqrt{timeproxim^2 + userdefinedproxim_1^2}$$

Equation 8 provides a possible event distance computation between event and valuable event taking event time, event application proximity, and event user defined proximity into account:

Time, Application and User Defined Proximity $$DISTANCEOF(EVENT, VALUEABLE\_EVENT) = \sqrt{timeproxim^2 + appproxim^2 + userdefinedproxim_1^2}$$

Equation 8

Equation 9 provides a possible event distance computation between event and valuable event taking event time, event geographical position, and event user defined proximity into account.

Time, Geographical and User Defined Proximity $$DISTANCEOF(EVENT, VALUEABLE\_EVENT) = \sqrt{timeproxim^2 + geoproxim^2 + userdefinedproxim_1^2}$$

Equation 9

Equation 10 provides a possible event distance computation between event and valuable event taking time proximity, application proximity, and relationship proximity into account:

Time, Application and User Defined Proximity $$DISTANCEOF(EVENT, VALUEABLE\_EVENT) = \sqrt{timeproxim^2 + appproxim^2 + relationproxim^2}$$

Equation 10

It is noted that the distances computed in Equations 5-10 above are nonlimiting examples of Euclidean distances, i.e., each distance is expressed as a square root of a sum of squares of individual proximity values. However, distance may be computed using other formulae and methods. For example, distance may be expressed as a mean, by simply summing the normalized individual proximity values and then dividing that sum by the number of individual proximity values. A second example is Mahalanobis distance, which normalizes the proximity values based on a covariance matrix, thereby rendering the distance metric scale-invariant. A third example is Manhattan distance, which measures distance following only axis-aligned directions. A fourth example is Chebyshev distance, which measures distance using an assumption that only the most significant dimension is relevant. A fifth example is Minkowski distance, which is a generalization that takes each of the Euclidean distance, the Manhattan distance, and the Chebyshev distance into account.

Figure 8:
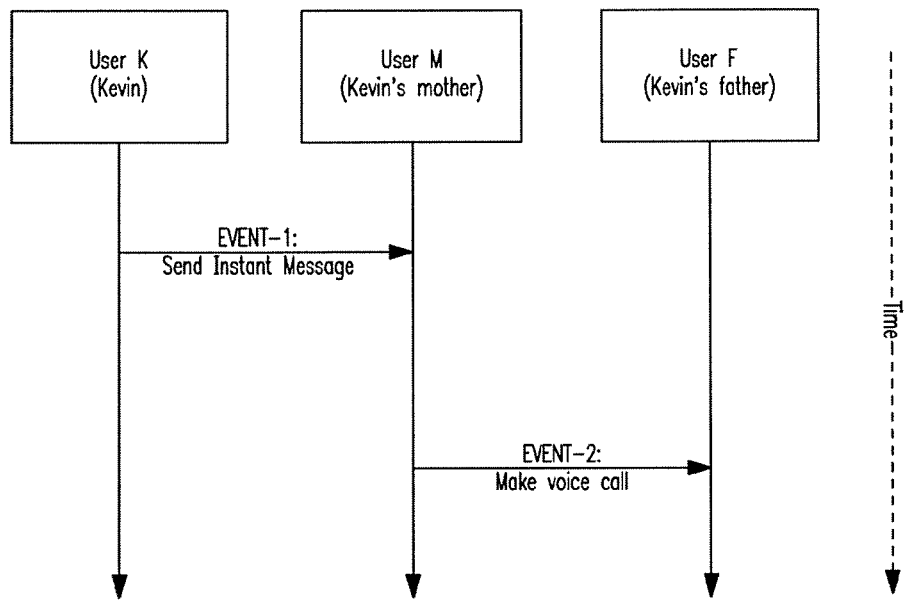
FIG. 8 illustrates an exemplary scenario for a first test case of assessing a value of a mobile application according to a preferred embodiment of the invention.

Referring to FIG. 8, a first exemplary test case involves an instant message (IM) triggering a voice call between family members. This use case has three flavors.

Test Case 1A—First Flavor
1. User K sends an instant message via instant messaging application A to his mother, user M.
2. After 2 minutes, user M makes a voice call to user F (user K's father) and talks for 10 minutes (this is a valuable event which has revenue associated with it).
3. The system is instructed to compute the application value of the "IM application".

Test Case 1B—Second Flavor
This flavor is similar to the first flavor, except that the voice call is shorter and yields just 0.5 USD$. Accordingly, the computed impact of the IM application should be smaller according to the original algorithm, or the same according to the alternative impact computation.

Test Case 1C—Third Flavor
Again, this flavor is similar to the first flavor, except that the voice call is triggered after 1 hour (60 minutes) instead of 2 minutes.

TABLE 2

| | Test Case #1 Events | | |
|---|---|---|---|
| | Use case 1 events (1st flavor) | Use case 1 events (2nd flavor) | Use case 1 events (3rd flavor) |
| IM application A events | EVENT-1: 'IM send message' event from user K to user M Unique ID 123456 Time: 12:38 | EVENT-1: 'IM send message' event from user K to user M Unique ID 124536 Time: 12:38 | EVENT-1: 'IM send message' event from user K to user M Unique ID 17896 Time: 12:38 |

TABLE 2-continued

Test Case #1 Events

|  | Use case 1 events (1st flavor) | Use case 1 events (2nd flavor) | Use case 1 events (3rd flavor) |
|---|---|---|---|
| Valuable events in the telecom operator network | Source: User K<br>Application: IM<br>Campaign: none<br>Type: instant message<br>Billing: none<br>Value ($ or other): none<br>Location: SW5 9PR<br>UserDefined attributes (0 ... N): none<br>EVENT-2: 'Phone call' event from user M to user F<br>Unique ID 444232<br>Time: 12:40<br>Source: User M<br>Application: Voice<br>Campaign: none<br>Type: phone call<br>Billing: yes<br>Value ($ or other): 10 minutes landline call time (assume 1 USD)<br>Location: SW5 9PR<br>UserDefined attributes (0 ... N): none | Source: User K<br>Application: IM<br>Campaign: none<br>Type: instant message<br>Billing: none<br>Value ($ or other): none<br>Location: SW5 9PR<br>UserDefined attributes (0 ... N): none<br>EVENT-2: 'Phone call' event from user M to user F<br>Unique ID 555232<br>Time: 12:40<br>Source: User M<br>Application: Voice<br>Campaign: none<br>Type: phone call<br>Billing: yes<br>Value ($ or other): 5 minutes landline call time (assume 1 USD)<br>Location: SW5 9PR<br>UserDefined attributes (0... N): none | Source: User K<br>Application: IM<br>Campaign: none<br>Type: instant message<br>Billing: none<br>Value ($ or other): none<br>Location: SW5 9PR<br>UserDefined attributes (0 ... N): none<br>EVENT-2: 'Phone call' event from user M to user F<br>Unique ID 666232<br>Time: 13:38<br>Source: User M<br>Application: Voice<br>Campaign: none<br>Type: phone call<br>Billing: yes<br>Value ($ or other): 10 minutes landline call time (assume 1 USD)<br>Location: SW5 9PR<br>UserDefined attributes (0 ... N): none |

In Test case #1, the user configures the system to only count events that are up to a distance of 3, and the user configures the system to use the distance equation shown in Equation 6 (i.e., one out of many possible distance equations):

Test case #1 Formula    Equation 9

$$DISTANCEOF(EVENT, VALUABLE\_EVENT) = \sqrt{timeproxim^2 + relationproxim^2}$$

TABLE 3

Test Case #1 Impact Calculation

|  | Time proximity (EVENT-1, EVENT-2) (minutes, but can be normalized to any unit to align with the other distance elements) | Relation proximity (EVENT-1, EVENT-2) | DISTANCE OF (EVENT-1, EVENT-2) (according to equation from FIG. 8) | Likelihood = 1/DISTANCE OF | Algorithm output Impact = Likelihood (event-1, event-2) * value (event-2) | Algorithm output Alternative impact (see paragraph [0064]) |
|---|---|---|---|---|---|---|
| 1st flavor | 2 | 1 (events from same family members) | 2.23 (so under 3 and taken under account) | 0.447 | 0.447 | 1 USD |
| 2nd flavor | 2 | 1 | 2.23 | 0.447 | 0.223 | 1 USD |
| 3rd flavor | 60 | 1 | 60.008 | 0.016664 | 0.016 | 0 USD |

Referring to Table 3, an exemplary impact calculation for Test case #1 is shown. It is noted that the impact of the IM application is bigger in the Test case 1A because the voice call is longer. It is further noted that in Test case 1C, the impact is much smaller, and the alternative impact is zero, because the time proximity between the voice call and the IM is too remote In other words, the IM application is determined to have had no real impact on the voice call.

Figure 9:
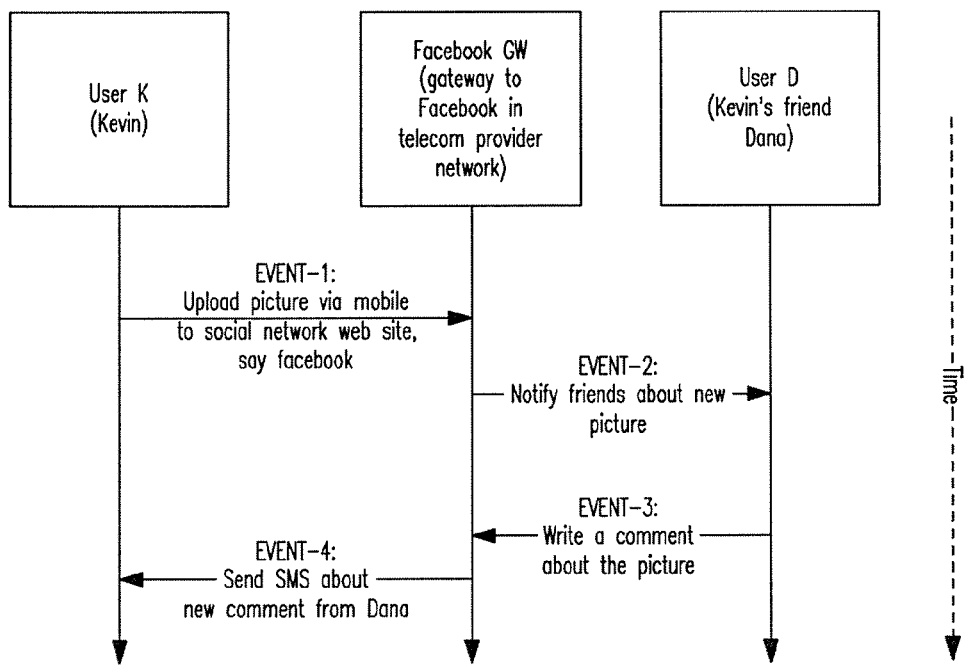
FIG. 9 illustrates an exemplary scenario for a second test case of assessing a value of a mobile application according to a preferred embodiment of the invention.

Referring to FIG. 9, a second exemplary test case involves a social network picture upload triggering an SMS transmission between friends.

Test Case 2

1. User K (Kevin) uploads a picture to his Facebook site.

2. After three minutes, user D (Dana) looks at her Facebook account and sees that her friend Kevin uploaded a new picture.

3. User D writes a comment under the picture.

4. The comment triggers Facebook to send an SMS to user K saying "Dana has commented about your photo".

TABLE 4

| | Test Case #2 Events | | |
|---|---|---|---|
| Facebook application events | EVENT-1: 'upload picture' event from user K to his profile on Facebook<br>Unique ID 6734346<br>Time: 12:38<br>Source: User K<br>Target: User K<br>(via Facebook)<br>Application: Facebook client<br>Campaign: none<br>Type: social networks picture upload<br>Billing: none<br>Value ($ or other): none<br>Location: SW5 9PR<br>UserDefined attributes (0 . . . N): none | EVENT-2: 'friend picture upload notification' event from Facebook to user D<br>Unique ID 663456<br>Time: 12:39<br>Source: User D<br>(via Facebook)<br>Target: User D<br>Application: Facebook client<br>Campaign: none<br>Type: Social Networks picture upload<br>Billing: none<br>Value ($ or other): none<br>Location: SW5 9PR<br>UserDefined attributes (0 . . . N): none | EVENT-3: 'write comment' event from user D to Facebook<br>Unique ID 663456<br>Time: 12:58<br>Source: User D<br>Target: User K<br>(via Facebook)<br>Application: Facebook client<br>Campaign: none<br>Type: picture comment<br>Billing: none<br>Value ($ or other): none<br>Location: SW5 9PR<br>UserDefined attributes (0 . . . N): none |
| Valuable events in the telecom operator network | EVENT-4: 'SMS' event from Facebook to user K<br>Unique ID 556232<br>Time: 13:00<br>Source: Facebook<br>Target: User K<br>Application: SMS (sent by Facebook)<br>Campaign: none<br>Type: phone call<br>Billing: yes<br>Value (S or other): 2 USD (assumed cost of SMS)<br>Location: SW5 9PR<br>UserDefined attributes (0 . . . N): none | | |

In Test case #2, the user configures the system so that "Facebook" and SMS events have an application proximity equal to 1 (i.e., they are deemed to be "near" applications). Additionally, the user configures the system to only count events that are up to a distance of 3, and the user configures the system to use the distance equation shown in Equation 10 (i.e., one out of many possible distance equations):

Test Case #2 Formula $$DISTANCEOF(\text{EVENT, VALUEABLE\_EVENT}) = \sqrt{timeproxim^2 + appproxim^2 + relationproxim^2}$$

Equation 10

Test Case 3

1. User K (Kevin) initiates a viral party invitation to a group of friends, asking them to forward the invitation and also asking everyone that's coming to the party to call him for confirmation.
2. User G (Gary) receives the email and calls User K (Kevin) to confirm.
3. User D (Dana) receives the email and forwards to her friend, user M (Michelle), then calls Kevin to confirm.
4. User M (Michelle) receives the email and calls Kevin to confirm.

Referring to Table 6, as the system collects these events, it identifies they all belong to the same email, for example, by

TABLE 5

Test Case #2 Impact Calculation

| | Time proximity | Relation proximity | Application proximity | DISTANCE OF | Likelihood = 1/DISTANCE OF | Algorithm output | Algorithm output Alternative impact (see paragraph [0064]) |
|---|---|---|---|---|---|---|---|
| Event-1 | 22 | 1 | 1 | 22.04 | 0.045 | | |
| Event-4 | | | | | | | |
| Event-2 | 21 | 1 | 1 | 21.04 | 0.047 | | |
| Event-4 | | | | | | | |
| Event-3 | 2 | 1 | 1 | 2.04 | 0.49 | 0.49 * 2 = 0.98 | 2 USD |
| Event-4 | | | | | | | |

Referring to Table 5, an exemplary impact calculation for Test case #2 is shown. Three different likelihood figures are generated by the formula, and the algorithm chooses the third one because it has the largest "likelihood" figure. Therefore, the impact of the Facebook application on valuable events (a single SMS in this example) is 0.98 or 2 USD, depending on the computation method chosen.

Figure 10:
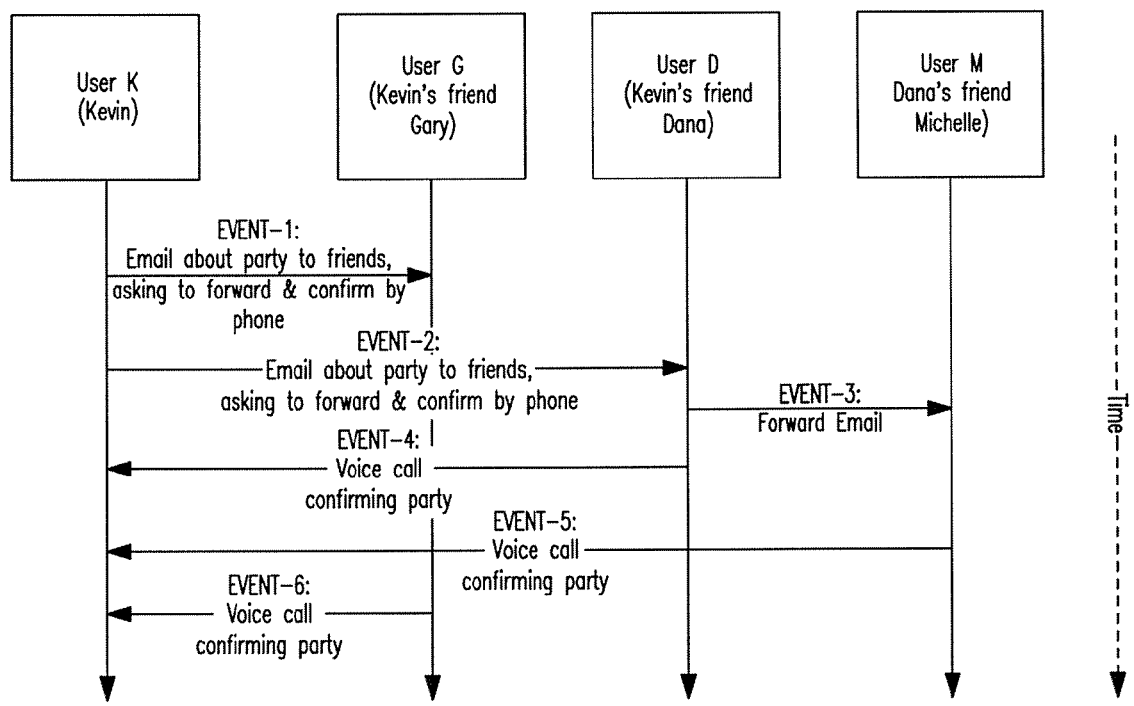
FIG. 10 illustrates an exemplary scenario for a third test case of assessing a value of a mobile application according to a preferred embodiment of the invention.

Referring to FIG. 10, a third exemplary test case involves a viral party email triggering multiple voice telephone calls.

using the email title. The system itself, while collecting these events, marks the users as being part of the "email campaign" for X hours, as they all receive or send email with the same title. As a result, the events that these users generate are marked with a user-defined attribute that specifies this. The user-defined attribute could include campaign name, ID, etc. The system also detects that the users, while under the campaign lifetime, have made voice telephone calls. This causes the system to configure the email application events and the voice events to have a "close" application proximity value (e.g., 1).

TABLE 6

Test Case #3 Events

| | | | |
|---|---|---|---|
| Email application events | EVENT-1: 'party invite email' event from user K to user G<br>Unique ID 6734346<br>Time: 12:38<br>Source: User K<br>Target: User G<br>Application: email<br>Campaign: none<br>Type: regular email<br>Value ($ or other): none<br>Location: SW5 9PR<br>UserDefined attributes (0): 'party campaign with users K, D, G, M'<br>UserDefined attributes (1 ... N): none | EVENT-2: 'party invite email' event from user K to user D<br>Unique ID 663456<br>Time: 12:42<br>Source: User K<br>Target: User D<br>Application: email<br>Campaign: none<br>Type: regular email<br>Billing: none<br>Value ($ or other): none<br>Location: SW5 9PR<br>UserDefined attributes (0): 'party campaign with users K, D, G, M'<br>UserDefined attributes (1 ... N): none | EVENT-3: 'party invite email' event from user D to user M<br>Unique ID 663456<br>Time: 12:50<br>Source: User D<br>Target: User M<br>Application: email<br>Campaign: none<br>Type: regular email<br>Billing: none<br>Value ($ or other): none<br>Location: SW5 9PR<br>UserDefined attributes (0): 'party campaign with users K, D, G, M'<br>UserDefined attributes (1 ... N): none |
| Valuable events in the telecom operator network (voice calls in this use case) | EVENT-4: "voice call" event from User D to user K<br>Unique ID 556232<br>Time: 13:00<br>Source: User D<br>Target: User K<br>Application: voice<br>Campaign: none<br>Type: phone call<br>Billing: yes<br>Value ($ or other): 2.5 USD<br>Location: SW12 9PR<br>UserDefined attributes (0): 'party campaign with users K, D, G, M'<br>UserDefined attributes (1 ... N): none | EVENT-5: "voice call" event from user M to user K<br>Unique ID 556622<br>Time: 13:15<br>Source: User M<br>Target: User K<br>Application: voice<br>Campaign: none<br>Type: phone call<br>Billing: yes<br>Value ($ or other): 3 USD<br>Location: SW5 4PR<br>UserDefined attributes (0): 'party campaign with users K, D, G, M'<br>UserDefined attributes (1 ... N): none | EVENT-6: "voice call" event from user G to user K<br>Unique ID 556712<br>Time: 13:25<br>Source: User G<br>Target: User K<br>Application: voice<br>Campaign: none<br>Type: phone call<br>Billing: yes<br>Value ($ or other): 5 USD<br>Location: SW5 12PR<br>UserDefined attributes (0): 'party campaign with users K, D, G, M'<br>UserDefined attributes (1 ... N): none |

In Test case #3, the user configures the system to compute the application value of the "email application" by using the distance equation shown in Equation 8 (i.e., one out of many possible distance equations):

Test Case #3 Formula $$DISTANCEOF(EVENT, VALUEABLE\_EVENT) = \sqrt{timeproxim^2 + appproxim^2 + userdefinedproxim_i^2} \qquad \text{Equation 8}$$

TABLE 7

Test Case #3 Impact Calculation

| | Time proximity | Relation proximity | Application proximity | DISTANCE OF | Likelihood = 1/ DISTANCE OF | Selected for computation | Algorithm partial output | Algorithm partial output Alternative impact (see paragraph [0064]) |
|---|---|---|---|---|---|---|---|---|
| Event-1 Event-4 | 22 | 1 | 1 | 22.04 | 0.045 | NO (not minimal distance) | | |
| Event-1 Event-5 | 37 | 1 | 1 | 37.04 | 0.027 | NO (not minimal distance) | | |
| Event-1 Event-6 | 47 | 2 (friend of friend) | 1 | 47.05 | 0.021 | NO (not minimal distance) | | |
| Event-2 Event-4 | 18 | 1 | 1 | 18.05 | 0.055 | YES (closest to valuable event 4) | 0.055 * 2.5 = 0.135 | 2.5 |
| Event-2 Event-5 | 33 | 2 | 1 | 33.07 | 0.030 | NO (not minimal distance) | | |
| Event-2 Event-6 | 43 | 1 | 1 | 43.02 | 0.023 | NO (not minimal distance) | | |
| Event-3 Event-4 | 10 | 1 (two events from same user) | 1 | N/A (same user) | NA | NO (same user) | | |
| Event-3 Event-5 | 25 | 1 | 1 | 25.03 | 0.04 | YES (closest to valuable event 5) | 0.04 * 3 = 0.12 | 3 |
| Event-3 Event-6 | 35 | 2 | 1 | 35.07 | 0.028 | YES (closest to valuable event 6) | 0.028 * 5 = 0.14 | 5 |
| Final result: | | | | | | | 0.135 + 0.12 + 0.14 = 0.395 | 2.5 + 3 + 5 = 10.5 USD |

Referring to Table 7, an exemplary impact calculation for Test case #3 is shown. The accumulative contribution of the email application, in this example, to the valuable events (i.e. voice calls), is determined to be 0.395, or, using the alternative algorithm, 10.5 USD.

Other computation algorithms and formulae can be used instead of the distance/proximity measures ones provided above. The important factors are:
1) Application events are processed to analyze the application usage.
2) Formula calculates measurable impact of the application, using other valuable events that are significant (hence create value).
3) Based on the impact calculation, applications can then be:
   a. Compared to other application for value (either monetary or relative);
   b. Analyzed for financial return (return on investment, or ROI);
   c. Removed with negative/low impact;
   d. Charged to the eco-system (e.g. advertisers) for using the application based on the relative value;
   e. Included in research groups of applications for multiple inter-application impacts.

In addition, the invention event and impact calculation can be used in continuous manner on all applications, perpetually, in order to stimulate creation of data that will be then analyzed for trends, long term projections, etc. In this alternative embodiment of the invention, there is no specific configuration of the applications or events, and as a default, all events proximities are calculated, demanding more resources for the computations, but allowing more data driven analysis as required.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for assessing a value of a first application with respect to a use of a first mobile communication device, the system comprising at least one computer server in communication with the first mobile communication device via a network and at least a second communication device in communication with the first mobile communication device via the network, wherein the server is configured to:
   detect a use of the first mobile communication device with respect to the second communication device, wherein the detected use includes a use of the first application and a communication with the second communication device;
   assign at least a first proximity value to the detected use of the first mobile communication device with respect to the second communication device and the use of the first application;
   use the assigned at least first proximity value to determine an impact of the detected use of the first application upon the detected use of the first mobile communication device; and
   use the determined impact to assess a value of the detected use of the first application with respect to the detected use of the first mobile communication device.

2. The system of claim 1, wherein the use of the first mobile communication device is a revenue-generating use, and the server is further configured to determine an amount of revenue derived from the detected use of the first mobile communication device, and to use the determined impact and the determined amount of revenue to assess the value of the detected use of the first application with respect to the detected use of the first mobile communication device.

3. The system of claim 1, wherein the at least first assigned proximity value is selected from the group consisting of a relationship proximity value, a time proximity value, a geographical proximity value, an application proximity value, an action proximity value, and a user-defined proximity value.

4. The system of claim 1, wherein the at least first assigned proximity value includes at least a relationship proximity value and a time proximity value, and wherein the assigned relationship proximity value is based on a first predetermined set of criteria, and wherein the assigned time proximity value is based on a number of nanoseconds, microseconds, milliseconds, seconds, or minutes that elapse between the detected use of the first application and a detection of a response by the second communication device, and wherein the server is further configured to use the assigned relationship and time proximity values to determine an impact by computing a composite proximity distance value.

5. The system of claim 4, wherein the composite proximity distance value is selected from the group consisting of a Euclidean distance, a mean distance, a Mahalanobis distance, a Manhattan distance, a Chebyshev distance, and a Minkowski distance.

6. The system of claim 4, wherein the composite proximity distance value is computed by taking a square root of a sum of squares of the respective relationship and time proximity values.

7. The system of claim 4, wherein the server is further configured to assign a geographical proximity value to the detected use of the first mobile communication device with respect to the detected use of the first application, and to use the assigned relationship, time, and geographical proximity values to determine an impact of the detected use of the first application upon the detected use of the mobile communication device, wherein the assigned geographical proximity value is based on a geographical distance between a location associated with the detected use of the first application and a location associated with the second communication device, and wherein the server is further configured to use the assigned relationship, time, and geographical proximity values to determine an impact by taking a square root of a sum of squares of the respective relationship, time, and geographical proximity values.

8. The system of claim 4, wherein the server is further configured to assign at least a first user-defined proximity value to the detected use of the mobile communication device with respect to the detected use of the first application, and to use the assigned relationship, time, and user-defined proximity values to determine an impact of the detected use of the first application upon the detected use of the mobile communication device, wherein the at least first assigned user-defined proximity value is based on a second predetermined set of criteria, and wherein the server is further configured to use the assigned relationship, time, and user-defined proximity values to determine an impact by taking a square root of a sum of squares of the respective relationship, time, and user-defined proximity values.

9. The system of claim 1, wherein the first application is selected from the group consisting of: an instant messaging application; a text messaging application; a social networking application; an electronic mail application; a multimedia messaging application; a search application; a location application; an advertising application; a file sharing application; a portal/intranet application; a CRM application; an ERP application; an address book application; a database application; a process application; a procurement application; a blog application; an internal network collaboration application; a video download application; an audio download application; a video teleconference application; an audio teleconference application; a video streaming application; an audio streaming application; a picture album application; an Internet web site application; a web browsing application; a peer-to-peer file sharing or media streaming application; a voice-over Internet protocol application; a payment application; a financial or investment application; an insurance application; and a marketing application.

10. The system of claim 1, wherein the use of a mobile communication device is selected from the group consisting of conducting a voice telephone call, sending a text message, sending an electronic mail message, using a web browser, uploading data, downloading data, sending information over a mobile data channel, and receiving information over a mobile data channel.

11. A method for assessing a value of a first application with respect to a use of a first mobile communication device, the first mobile communication device being in communication with a second communication device via a network, and the method comprising the steps of:
 detecting a use of the first mobile communication device with respect to the second communication device, wherein the detected use includes a use of the first application and a communication with the second communication device;
 assigning at least a first proximity value to the detected use of the first mobile communication device with respect to the second communication device and the use of the first application;
 using the assigned at least first proximity value to determine an impact of the detected use of the first application upon the detected use of the first mobile communication device; and
 using the determined impact to assess a value of the detected use of the first application with respect to the detected use of the first mobile communication device.

12. The method of claim 11, wherein the use of the first mobile communication device is a revenue-generating use, and the step of using the determined impact to assess a value further comprises the steps of determining an amount of revenue derived from the detected use of the first mobile communication device, and using the determined impact and the determined amount of revenue to assess the value of the detected use of the first application with respect to the detected use of the first mobile communication device.

13. The method of claim 11, wherein the at least first assigned proximity value is selected from the group consisting of a relationship proximity value, a time proximity value, a geographical proximity value, an application proximity value, an action proximity value, and a user-defined proximity value.

14. The method of claim 11, wherein the at least first assigned proximity value includes at least a relationship proximity value and a time proximity value, and wherein the assigned relationship proximity value is based on a first predetermined set of criteria, and wherein the assigned time proximity value is based on a number of nanoseconds, microseconds, milliseconds, seconds, or minutes that elapse between the detected use of the first application and a detection of a response by the second communication device, and the step of using the assigned relationship and time proximity values to determine an impact further comprises using the assigned relationship and time proximity values to determine an impact by computing a composite proximity distance value.

15. The method of claim 14, wherein the composite proximity distance value is selected from the group consisting of a Euclidean distance, a mean distance, a Mahalanobis distance, a Manhattan distance, a Chebyshev distance, and a Minkowski distance.

16. The method of claim 14, wherein the composite proximity distance value is computed by taking a square root of a sum of squares of the respective relationship and time proximity values.

17. The method of claim 14, further comprising the step of assigning a geographical proximity value to the detected use of the first mobile communication device with respect to the detected use of the first application, wherein the step of using the assigned relationship and time proximity values to determine an impact of the detected use of the first application upon the detected use of the first mobile communication device further comprises using the assigned relationship, time, and geographical proximity values to determine an impact of the detected use of the first application upon the detected use of the first mobile communication device, wherein the assigned geographical proximity value is based on a geographical distance between a location associated with the detected use of the first application and a location associated with the second communication device, and the step of using the assigned relationship, time, and geographical proximity values to determine an impact further comprises taking a square root of a sum of squares of the respective relationship, time, and geographical proximity values.

18. The method of claim 14, further comprising the step of assigning at least a first user-defined proximity value to the detected use of the mobile communication device with respect to the detected use of the first application, wherein the step of using the assigned relationship and time proximity values to determine an impact of the detected use of the first application upon the detected use of the mobile communication device further comprises using the assigned relationship, time, and user-defined proximity values to determine an impact of the detected use of the first application upon the detected use of the mobile communication device, wherein the at least first assigned user-defined proximity value is based on a second predetermined set of criteria, and the step of using the assigned relationship, time, and user-defined proximity values to determine an impact further comprises taking a square root of a sum of squares of the respective relationship, time, and user-defined proximity values.

19. The method of claim 11, wherein the first application is selected from the group consisting of: an instant messaging application; a text messaging application; a social networking application; an electronic mail application; a multimedia messaging application; a search application; a location application; an advertising application; a file sharing application; a portal/intranet application; a CRM application; an ERP application; an address book application; a database application; a process application; a procurement application; a blog application; an internal network collaboration application; a video download application; an audio download application; a video teleconference application; an audio teleconference application; a video streaming application; an audio streaming application; a picture album application; an Internet web site application; a web browsing application; a peer-to-peer file sharing or media streaming application; a voice-over Internet protocol application; a payment application; a financial or investment application; an insurance application; and a marketing application.

20. The method of claim 11, wherein the use of a mobile communication device is selected from the group consisting of conducting a voice telephone call, sending a text message, sending an electronic mail message, using a web browser, uploading data, downloading data, sending information over a mobile data channel, and receiving information over a mobile data channel.

* * * * *